United States Patent [19]

Furuta

[11] Patent Number: 5,369,173
[45] Date of Patent: Nov. 29, 1994

[54] GLASS FIBER-REINFORCED RESIN COMPOSITION

[75] Inventor: Motonobu Furuta, Tsukuba, Japan

[73] Assignee: Sumitomo Chemical Company, Limited, Osaka, Japan

[21] Appl. No.: 5,416

[22] Filed: Jan. 19, 1993

Related U.S. Application Data

[63] Continuation of Ser. No. 662,183, Feb. 28, 1991, abandoned, which is a continuation-in-part of Ser. No. 479,857, Feb. 14, 1990, abandoned.

[30] Foreign Application Priority Data

Jun. 13, 1989 [JP] Japan .................. 1-148481

[51] Int. Cl.$^5$ .................. C08L 23/10; C08L 71/12
[52] U.S. Cl. .................. 525/68; 428/36.92; 524/504; 524/508; 525/74; 525/905; 525/70
[58] Field of Search .................. 525/68, 74, 70, 905; 428/36.92; 524/508, 504

[56] References Cited

U.S. PATENT DOCUMENTS

| | | | |
|---|---|---|---|
| 3,732,169 | 5/1973 | Burrous et al. | 252/78 |
| 3,929,930 | 12/1975 | Izawa et al. | 260/874 |
| 4,003,874 | 1/1977 | Ide et al. | 260/42.18 |
| 4,097,556 | 6/1978 | Toyama et al. | 260/886 |
| 4,564,658 | 1/1986 | Liu . | |
| 4,801,645 | 1/1989 | Nishio et al. | 525/68 |
| 4,849,486 | 7/1989 | Tsuchiya et al. | 525/68 |
| 4,863,997 | 9/1989 | Shibuya et al. | 525/905 |
| 4,972,021 | 11/1990 | Lee, Jr. | 525/132 |
| 5,132,363 | 7/1992 | Furuta et al. | 525/68 |
| 5,159,004 | 10/1992 | Furuta et al. | 525/68 |
| 5,166,264 | 11/1992 | Lee, Jr. et al. | 525/92 |

FOREIGN PATENT DOCUMENTS

| | | |
|---|---|---|
| 0307802 | 3/1989 | European Pat. Off. . |
| 0356194 | 2/1990 | European Pat. Off. . |
| 24-75663 | 7/1949 | Japan . |
| 35-118739 | 6/1960 | Japan . |
| 12197 | 1/1973 | Japan . |
| 5623 | 3/1974 | Japan . |
| 50-76149 | 6/1975 | Japan . |
| 51-10265 | 4/1976 | Japan . |
| 30991 | 1/1977 | Japan . |
| 52-43857 | 4/1977 | Japan . |
| 58-19347 | 2/1983 | Japan . |
| 3105022 | 5/1988 | Japan .................. 525/68 |
| 3122755 | 5/1988 | Japan .................. 525/68 |

OTHER PUBLICATIONS

*Modern Plastics Encyclopedia,* "Coupling Agents: Silanes"; vol. 60, No. 10A (Oct., 1983). pp. 117–119.

*Primary Examiner*—James J. Seidleck
*Assistant Examiner*—Thomas Hamilton, III
*Attorney, Agent, or Firm*—Birch, Stewart, Kolasch & Birch

[57] ABSTRACT

A resin composition is disclosed, which comprises
(A) 100 parts by weight of
 (a) 1 to 50% by weight of polyphenylene ether or polyphenylene ether-containing resin composition,
 (b) 10 to 90% by weight of propylene polymer, except a propylene polymer modified with an oxygen-containing unsaturated compound,
 (c) 10 to 40% by weight of propylene polymer modified with an oxygen-containing unsaturated organic compound, and
 (d) 0 to 30% by weight of rubber-like substance which is elastic at room temperature, and
(B) 3 to 60 parts by weight of
 (e) glass fiber. The resin composition has the remarkable effect that it not only has favorite mold processability but also is superior in balance among various physical properties of shaped articles resulting therefrom.

12 Claims, No Drawings

GLASS FIBER-REINFORCED RESIN COMPOSITION

This application is a continuation of application Ser. No. 07/662,183 filed on Feb. 28, 1991, now abandoned, which is a continuation-in-part of patent application Ser. No. 07/479,857, filed on Feb. 14, 1990, now abandoned the entire contents of which are hereby incorporated by reference.

BACKGROUND OF THE INVENTION

1. Field of the Invention

The present invention relates to a glass fiber reinforced resin composition having excellent mechanical properties such as heat resistance, mechanical strength, impact strength and the like as well as excellent coatability.

2. Description of the Related Art

Glass fiber-reinforced propylene resins are put into practice in various applications such as parts of cars, electronic devices, etc. because they have excellent mechanical properties and heat resistance.

For example, it is known that resin compositions blended with crystalline polypropylene, polypropylene modified with oxygen containing unsaturated organic compound, glass fiber treated with a silane compound on its surface, and an ethylene-α-olefin rubbery polymer have excellent mechanical properties as described in Japanese Patent Publication (Kokai) No. 19347/1983.

However, polypropylene, which is one of the main components of the compositions, is nonpolar and therefore it is difficult to perform the surface treatment of the composition such as coating, printing, bonding, hot stamping, and plating by vapor deposition. Therefore various ideas have been proposed to overcome the disadvantage.

For example, it has been studied and put into practice to etch the surface of polypropylene molded products by a physical or chemical process to modify their surfaces, thus performing the surface treatment thereof. However, this process is disadvantageous in that it does not only call for complicated steps but the molded products would also cause deformation depending on of the conditions under which the etching is carried out, or the effect obtained is insufficient. Thus, the process actually gives no satisfactory results despite high costs.

On the other hand, as described in, for example, Japanese Patent Publication (Kokai) No. 76149/1975 and Japanese Patent Publication (Kokoku) No. 10265/1976, there have been proposed an improved process in which polypropylene is graft-modified with an unsaturated carboxylic acid or its anhydride such as acrylic acid and maleic anhydride in the presence of a polymerization initiator such as an organic peroxide, or a process in which such graft-modified product is blended with non-modified polypropylene.

However, these processes have defects that the amount of the unsaturated carboxylic acid or its anhydride to be introduced by graft-modification is restricted because a decomposition reaction of polypropylene with peroxide takes place simultaneously, resulting in that the effect of the modification of the surface of the resin is insufficient, or even if sufficient effect is obtained another problem on the mechanical property occurs due to the fact that the molecular weight of the resin decreases because of the decomposition reaction.

SUMMARY OF THE INVENTION

In order to overcome the above-described problems, the present inventors have conducted intensive investigation and completed the present invention.

Therefore, the present invention provides a resin composition having excellent heat resistance, mechanical properties and coating ability, comprising
(A) 100 parts by weight of
 (a) 1 to 50% by weight of polyphenylene ether or polyphenylene ether-containing resin composition,
 (b) 10 to 90% by weight of propylene polymer, except a propylene polymer modified with an oxygen-containing unsaturated compound,
 (c) 10 to 40% by weight of propylene polymer modified with an oxygen-containing unsaturated organic compound, and
 (d) 0 to 30% by weight of rubber-like substance which is elastic at room temperature, and
(B) 3 to 60 parts by weight of
 (e) glass fiber.

DETAILED DESCRIPTION OF THE INVENTION

The polyphenylene ether used as the component (a) in the present invention is a polymer which can be obtained, for example, by oxidation polymerization of one or more of phenol compounds having the formula (I)

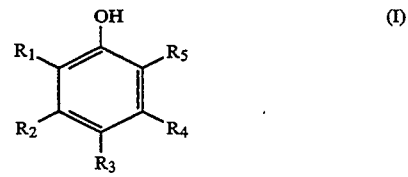

wherein $R_1$, $R_2$, $R_3$, $R_4$ and $R_5$ each represents a hydrogen atom, a halogen atom, or a substituted or unsubstituted hydrocarbon residue, and at least one of them is a hydrogen atom, with molecular oxygen or gas containing the same in the presence of an oxidation coupling catalyst.

Examples of $R_1$ to $R_5$ are a hydrogen atom, a chlorine atom, a bromine atom, a fluorine atom, an iodine atom, a methyl group, an ethyl group, an n- or isopropyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group and an allyl group.

Examples of the phenol compounds are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-tert.-butylphenol, thymol and 2-methyl-6-allylphenol. Alternatively, a copolymer of any of the phenol compounds listed above and the other phenol compound, for example, polyhydroxy aromatic compound, may be employed. The polyhydroxy aromatic compound is, for example, bisphenol A, tetrabromobisphenol A, resorcin, hydroquinone and novolak resin.

Preferred examples of the polymers are homopolymer of 2,6-di- methylphenol or 2,6-diphenylphenol and copolymers of a large amount of 2,6-dimethylphenol and a small amount of 3-methyl-6-tert.-butylphenol or of 2,3,6-trimethylphenol.

Any oxidation coupling catalyst may be employed for oxidation polymerization of phenol compound, as long as it has polymerization ability. Examples thereof are cuprous compound/tert. amine such as cuprous chloride/triethylamine and cuprous chloride/pyridine; cupric compound/amine/alkali metal hydroxide such as cupric chloride/pyridine/potassium hydroxide; manganese salt/primary amine such as manganese chloride/ethanolamine and manganese acetate/ethylenediamine; manganese salt/alcoholate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used although polymers produced thereby have different properties.

The polyphenylene ether further includes that grafted with styrenic polymer or other polymer. For instance, a grafted one is obtained by graft-polymerizing styrene monomer and/or other comonomer in the presence of polyphenylene ether and organic peroxide (Japanese Patent Publications (Kokoku) 47862/1972, 12197/1973, 5623/1974, 38596/1977, and 30991/1977) or by melt-kneading polyphenylene ether and polystyrene in the presence of a radical initiator (Japanese Patent Publication (Kokai) 142799/1977).

As the polyphenylene ether resin, there can be used one having a reduced viscosity $\eta_{sp/C}$ of as measured in 0.5 g/dl chloroform solution at 25° C. of 0.2 to 0.6 dl/g, preferably 0.23 to 0.55 dl/g. When the $\eta_{sp/C}$ value is below 0.2 dl/g, the heat resistance of the composition is insufficient. On the other hand, the moldability of the composition decreases when the $\eta_{sp/C}$ value exceeds 0.6 dl/g.

The polyphenylene ether-containing resin composition used as the component (a) is a resin composition composed of the above-described polyphenylene ether, an alkenyl aromatic resin and/or a rubber-modified alkenyl aromatic resin.

The alkenyl aromatic resin is one containing at least 25% by weight of a polymer unit derived from a monomer having the formula (II)

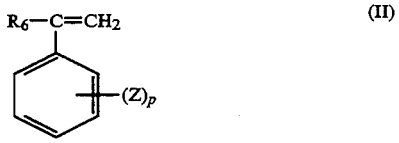

wherein $R_6$ represents a hydrogen atom, a lower alkyl group (for example, an alkyl group having 1 to 4 carbon atoms), or a halogen atom, Z represents a hydrogen atom, a vinyl group, a halogen atom, a hydroxyl group, or a lower alkyl group, p is 0 or an integer of from 1 to 5.

Examples of the alkenyl aromatic resin include homopolymers such as polystyrene, polychlorostyrene, and poly-α-methylstyrene, and copolymers thereof styrene-containing copolymers, for example, styrene/acrylonitrile copolymer, styrene/divinylbenzene copolymer, and styrene/acrylonitrile/α-methylstyrene copolymer. Of these, preferred are homopolystyrene, styrene/α-methylstyrene copolymer, styrene/acrylonitrile copolymer, styrene/α-chlorostyrene copolymer, and styrene/methyl methacrylate copolymer. Particularly preferred is homopolystyrene.

The rubber-modified alkenyl aromatic resin is a binary phase resin system composed of an alkenyl aromatic resin matrix and rubber particles dispersed therein.

The rubber-modified alkenyl aromatic resin can be produced by various methods. For example, it can be obtained by mechanical mixing or by dissolving the rubber-like substance in the alkenyl aromatic monomer and then polymerizing the alkenyl aromatic monomer. The later method is used for producing so-called high-impact polystyrene on an industrial scale. Furthermore, the rubber-modified alkenyl aromatic resin used in the present invention also includes a mixture of the product obtained by the latter method and the rubber-like substance and/or alkenyl aromatic resin.

Blending ratio between polyphenylene ether and alkenyl aromatic resin and/or rubber-modified alkenyl aromatic resin may be varied widely in the range of, for example 1 to 99% by weight of polyphenylene ether and 99 to 1% by weight of alkenyl aromatic resin and/or rubber-modified alkenyl aromatic resin. Optimum composition is determined within this range depending on the purpose and utility.

The propylene polymer used in the component (b) and (c) includes homopolypropylene, block polypropylene and random polypropylene.

By the term "block polypropylene and random polypropylene" are meant block copolymer and random copolymer of propylene and α-olefin having 2 to 18 carbon atoms.

As the propylene polymer, there can be used propylene polymer alone or in the form of a mixture of two or more of them.

In the present invention, highly crystalline propylene polymer may be used as the propylene polymer in the component (b), if desired.

By the term "highly crystalline propylene polymer" is meant a propylene homopolymer or block copolymer which has an isotactic pentad fraction of 0.970 or higher, defined as an isotactic pentad fraction in the boiling heptane-insoluble portion of the propylene homopolymer or of a propylene homopolymer portion of the propylene block copolymer that is the first segment polymerized in the first step of propylene block copolymer formation, or a propylene polymer which has an isotactic pented fraction defined as above of 0.970 or higher and a content of a heptane-soluble portion of 5.0% by weight or less and a content of a 20° C. xylene-soluble portion of 2.0% by weight or less.

The above-described type of highly crystalline propylene polymers can be prepared by methods described in, for example, Japanese Patent Publication (Kokai) Nos. 28405/1985, 228504/1985, 208606/1986 and 287917/1986.

For applications to those fields where high rigidity is required, it is preferred to blend the propylene polymer with a nuclei generating agent. It is known that addition of, for example, aluminum or sodium salts of aromatic carboxylic acids (Japanese Patent Publication (Kokai) No. 80829/1983), and aromatic carboxylic acids, metal salts of aromatic phosphoric acids or sorbitol derivatives (Japanese Patent Publication (Kokoku) No. 12460/1980 and Japanese Patent Publication (Kokai) No. 129036/1983) or the like gives rise to nuclei of crystal grains thus serving as a nuclei generating agent (hereinafter, referred to as a nucleating agent).

It is also known that a polymer of vinylcycloalkane having 6 or more carbon atoms is effective as a lo nucleating agent (Japanese Patent Publication (Kokai) No. 1738/1987).

That is, a composition which comprises the propylene polymer blended with the polymer of vinylcycloalkane polymer having 6 or more carbon atoms and which contains from 0.05 to 10,000 ppm by weight of vinylcycloalkane unit in the composition has a higher crystallinity.

Furthermore, a propylene polymer having a high rigidity can be obtained by blending the propylene polymer having a high crystallinity with the vinylcycloalkane polymer.

The propylene polymer as the component (b) of the composition of the present invention preferably has an intrinsic viscosity [η] (tetraline solution, 135° C.) of from 1.00 to 1.50 dl/g. When propylene copolymer is used as the propylene polymer, the content of ethylene in the copolymer is preferably 4% by weight or less.

The components (b) and/or (c) of the resin composition of the present invention may be blended with a polymer obtained by graft-polymerizing a styrene-based monomer to a propylene polymer.

The styrene-based monomer is represented by the formula (III)

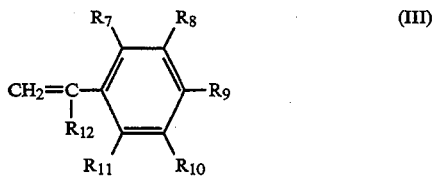

wherein $R_7$, $R_8$, $R_9$, $R_{10}$ and $R_{11}$ each represents a hydrogen atom, a halogen atom, a substituted or unsubstituted hydrocarbon residue, or a substituted or unsubstituted hydrocarbyloxy residue, and $R_{12}$ represents a hydrogen atom or a lower alkyl group having from 1 to 4 carbon atoms.

Specific examples of the atoms, groups or residues represented by $R_7$, $R_8$, $R_9$, $R_{10}$ or $R_{11}$ include a hydrogen atom, halogen atoms such as a chlorine atom, a bromine atom and an iodine atom, hydrocarbon residues such as a methyl group, an ethyl group, a propyl group, a vinyl group, an allyl group, a benzyl group and a methylbenzyl group; substituted hydrocarbon groups such as a chloromethyl group and a bromomethyl group; unsubstituted or substituted hydrocarbyloxy residues such as a methoxy group, an ethoxy group, a phenoxy group and a o monochloromethoxy group, and the like.

Specific examples of $R_{12}$ include a hydrogen atom, lower alkyl groups such as a methyl group and an ethyl group, and the like.

Specific examples of the styrene-based monomer include styrene, 2,4-dichlorostyrene, p-methoxystyrene, p-methylstyrene, p-phenylstyrene, p-divinylbenzene, p-(chloromethoxy) styrene, α-methylstyrene, o-methyl-α-methylstyrene, m-methyl-α-methylstyrene, p-methyl-α-methylstyrene and p-methoxy-α-methylstyrene. These compounds may be used singly or two or more of them may be used in the form of a mixture. Of these, styrene is preferred.

The component (c) is propylene polymer modified with an oxygen-containing unsaturated organic compound.

The oxygen-containing unsaturated organic compound used for the modification of the propylene polymer is an organic compound having an acid or acid anhydride group such as acrylic acid, methacrylic acid, maleic acid, itaconic acid, fumaric acid, maleic anhydride and itaconic anhydride. Acrylic acid and maleic anhydride are particularly preferred.

The propylene polymer modified with the oxygen-containing unsaturated organic compound as the component (c) can be prepared by a method in which the oxygen-containing unsaturated organic compound and a peroxide are added to a predetermined amount of propylene polymer and the mixture is melted and kneaded in an extruder, a method in which the oxygen-containing unsaturated organic compound is grafted to propylene polymer in water or a solvent using a peroxide, and the like.

The peroxide which can be used in the preparation of the modified propylene polymer is not limited particularly and any type of peroxides may be selected suitably.

Examples of the peroxide include azo compounds such as 2,2'-azobisisobutyronitrile, 2,2'-azobis(2,4,4-trimethylvaleronitrile), and organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5- di(t-butylperoxy)hexane, 2,5-dimethyl-2,5-di(t-butylperoxy) hexyne-3, lauroyl peroxide, 3,3,5-trimethylhexanoyl peroxide, benzoylperoxide, t-butyl peracetate, t-butyl peroxyisobutyrate, t-butyloxypivalate, t-butyloxy-2-ethyl hexanoate, t-butyl-peroxy- 3,5,5-trimethyl hexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleate, t-butyl peroxypropylcarbonate, and polystyrene peroxide.

The concentration of the oxygen-containing unsaturated organic compound, for example, maleic anhydride or acrylic acid, in the modified propylene polymer as the component (c) is not critical but is preferably from 0.3 to 6.0% by weight in view of the heat stability and graft ratio of the modified propylene polymer. The concentration of maleic anhydride or acrylic acid in the mixture is determined depending on the concentration of the glass fiber in the composition. Suitable ratio of acrylic acid or maleic arthydride to the glass fiber is from 0.01 to 0.06. when this ratio is below 0.01, the effect of modification is poor and on the other hand, when it is above 0.06, problem on heat resistance occurs in practical application.

In the resin composition of the present invention, o rubber-like substance can be used as component (d), if desired, with view to improve, particularly its impact strength.

By the term "rubber-like substance" is meant natural and synthetic polymeric materials which are elastic at room temperature.

Specific examples of the rubber-like substance include natural rubber, butadiene polymer, butadiene/styrene copolymer (all types including random, block and graft copolymers), or their hydrogenation products, isoprene polymer, chlorobutadiene polymer, butadiene/acrylonitrile copolymer, isobutylene polymer, isobutylene/butadiene copolymer, isobutylene/isoprene copolymer, acrylate copolymer, ethylene/propylene copolymer, ethylene/butene copolymer, ethylene/propylene/styrene terpolymer, styrene/isoprene copolymer or their hydrogenation products, styrene/butylene copolymer, styrene/ethylene/propylene terpolymer, perfluoro rubber, fluoro rubber, chloroprene rubber, butyl rubber, silicone rubber, ethylene/propylene/unconjugated diane terpolymer, thiocol rubber, polysulfide rubber, polyurethane rubber, polyether rubber (for example, propylene oxide, etc.), epichlorohydrin rubber, polyester elastomer, polyamide elastomer, epoxy group-containing copolymer, etc.

By the term "epoxy group-containing copolymer" is meant copolymers derived from an unsaturated epoxy compound and an ethylenically unsaturated compound.

There is no limitation on the ratio of the epoxy group-containing copolymer. However, preferred are those containing the unsaturated epoxy compound copolymerized in an amount of from 0.1 to 50% by weight, preferably from 1 to 30% by weight.

The unsaturated epoxy compound includes specifically compounds which have an unsaturated group copolymerizable with the ethylenically unsaturated compound and also have an epoxy group.

For example, there can be cited unsaturated glycidyl esters having the formula (IV) below and unsaturated glycidyl ether having the formula (V) below.

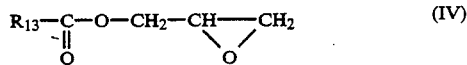

wherein $R_{13}$ is a $C_2$–$C_{18}$ hydrocarbon group having an ethylenically unsaturated bond.

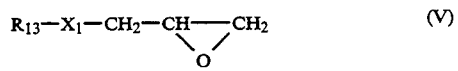

wherein $R_{13}$ is a $C_2$–$C_{18}$ hydrocarbon group having an ethylenically unsaturated bond, and $X_1$ is —$CH_2$—O— or

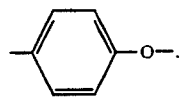

Specific examples thereof include glycidyl acrylate, glycidyl methacrylate, glycidyl itaconates, allyl glycidyl ether, 2-methylallyl glycidyl ether, styrene-p-glycidyl ether and the like.

On the other hand, the ethylenically unsaturated compound includes olefins, vinyl esters Of $C_2$–$C_6$ saturated carboxylic acids, $C_1$–$C_8$ saturated alcohol/acrylic or methacrylic acid esters, maleates, methacrylates, fumarates, halogenated vinyls, styrenes, nitriles, vinyl ethers or acrylamides. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrile, isobutyl vinyl ether and acrylamide. They are used singly or in a mixture of at least two of them. Ethylene is preferable most of all.

By copolymerizing other components such as vinyl acetate and/or methyl acrylate together with ethylene, a decrease in the glass transition point of the epoxy group-containing copolymer used as the rubber-like substance occurs, which improves further the impact strength at low temperatures of the resin composition of the present invention.

The rubber-like substance may be prepared by any method (e.g., emulsion polymerization, solution polymerization, etc.) using any type of catalyst (e.g., peroxides, trialkylaluminum, lithium halides, nickel-based catalyst, etc.).

In addition, there can be used those rubber-like substances having various degree of crosslinking, those having various proportions of microstructures (e.g., cis-structure, trans-structure, vinyl group, etc.), or those having various mean particle size of rubber particles.

Various copolymers including random copolymers, block copolymers, graft copolymers, etc. can be used as the rubber-like substance in the present invention. Also, modified products derived from these copolymers can be used as the rubber-like substance.

Examples of the modified products include those modified with one or more of styrene, maleic anhydride, glycidyl methacrylate, glycidyl acrylate or carboxylic acid-containing compounds.

These rubber-like substances (inclusive of modified products) can be used singly or as a mixture of two or more of them.

Among them, ethylene/α-olefin copolymer rubber or its modified products are preferably used.

The ethylene/α-olefin copolymer rubber includes copolymer rubbers of ethylene with other α-olefins such as propylene, butene-1, pentene-1, hexene-1, 4-methyl-pentene-1 or octene-1 and terpolymer rubbers of ethylene/propylene/butene-1 terpolymer, and the like.

The ethylene content of the ethylene/α-olefin copolymer rubber is 15 to 85% by weight, preferably 40 to 85% by weight. Highly crystalline copolymers having an ethylene content of above 85% by weight are difficult to process under ordinary rubber molding conditions and those having an ethylene content of below 15% by weight are undesirable since they have increased glass transition point (Tg), which deteriorates their rubber-like properties. Preferred glass transition point is −10° C. or less.

Ethylene/α-olefin/non-conjugated diene terpolymer rubber can also be used. However, it is required that the content of the non-conjugated diene is 20% by weight or less. This is because with more than 20% by weight of nonconjugated diene, gelation occurs while kneading, which results in deterioration of the flowability of the D resin composition and thus is undesirable.

Preferred examples of the non-conjugated dienes include ethylidenenorbornene, dicyclopentadiene, 1,4-hexadiene, and the like.

It is preferred that the number average molecular weight of the copolymer rubber is in the range of 10,000 to 100,000 in order to facilitate kneading.

When the molecular weight is too small, it is difficult to handle the copolymer rubber upon supplying it to an extruder. On the other hand, the flowability of the copolymer decreases to make it difficult to handle the copolymer rubber when its molecular weight is too large.

Mooney viscosity ($ML_{1+4}$, 121° C.) is preferably 5 to 120.

Molecular weight distribution is not limited particularly. However, preferred range of Q value (weight average molecular weight/number average molecular weight) is 1 to 30, more preferably 2 to 20.

The modified ethylene/α-olefin copolymer rubber used as the rubber-like substance (component (d)) includes unsaturated dicarboxylic acid-modified ethylene/α-olefin copolymer obtained by graft copolymerizing an unsaturated dicarboxylic acid onto the above-described ethylene/α-olefin copolymer rubber as starting material.

Examples of the unsaturated dicarboxylic acid are maleic anhydride, maleic acid, fumaric anhydride, citraconic anhydride, etc.

Any known process can be used to prepare the modified ethylene/α-olefin copolymer rubber.

For example, maleic anhydride-modified ethylene/α-olefin copolymer can be prepared by adding maleic anhydride and a radical initiator to ethylene/α-olefin copolymer in a hydrocarbon solvent and reacting them at 60° to 150° C. for several minutes to several hours to obtain a solution containing a modified rubber. In this case, an alcohol or amide can be added appropriately, if desired, to convert maleic anhydride to its half ester or half amide. The solution thus obtained is poured into a large amount of methanol, acetone or the like to recover the modified rubber.

The modified rubber can also be obtained by kneading maleic anhydride and the radical initiator together with the ethylene/α-olefin copolymer in an extruder. For example, the modified rubber can be obtained by kneading 0.5 to 15 parts by weight of maleic anhydride and 0.005 to 1.0 part by weight of the radical initiator per 100 parts by weight of the rubber at 150° to 300° C. for several minutes to several tens minutes. In this case, a gelation preventing agent, a phenolic antioxidant such as butylated hydroxytoluene and the like can be used in combination, if desired.

In addition to the above-described maleic anhydride-modified ethylene/α-olefin copolymer rubber, various modified ethylene/α-olefin copolymer rubber can be used, for example, those modified ethylene/α-olefin copolymer rubbers which are modified with a monomeric compound other than maleic anhydride selected from methyl acrylate, methyl methacrylate, allyl glycidyl ether, glycidyl methacrylate, glycidyl acrylate, etc.

Also, modified ethylene/α-olefin copolymer rubbers which are modified with two or more of the monomeric compounds described above can be used.

Furthermore, two or more rubbers selected from the ethylene/α-olefin copolymer rubber and various modified ethylene/α-olefin copolymer rubbers can be used simultaneously.

Although the styrene-based monomer-grafted modified ethylene/α-olefin copolymer rubber can be obtained by the above-described method, it can also be obtained by the following method.

That is, styrene-based monomer-grafted modified ethylene/α-olefin copolymer rubber can be obtained by dispersing chips or pellets of the ethylene/α-olefin copolymer rubber in purified water together with a dispersing agent, impregnating the rubber with a styrene-based monomer, and then reacting them using a radical initiator at 50° to 150° C for 1 to 5 hours.

The component (e) of the resin composition of the present invention is a glass fiber which is used in ordinary glass fiber reinforced resins, having a diameter of generally 5 to 20 μm.

The glass fiber is preferably treated with various kinds of surface treating agents. As the glass fiber there can be used preferably the one treated with a silane compound.

The silane compound is at least one selected from epoxysilanes such as β-(3,4-epoxycyclohexyl) ethyltrimethoxysilane and γ-glycidoxypropyltrimethoxysilane, vinylsilanes such as vinyltriethoxysilane and vinyltrichlorosilane, and aminosilanes such as γ-aminopropyltriethoxysilane and N-β -(aminoethyl)-γ-aminopropyltrimethoxysilane.

The surface treatment is usually performed by a method in which the glass fiber is dipped in the surface treating agent containing the silane compound followed by drying.

The silane compound is preferably added in an amount of 0.02 to 0.2 PHP (part by weight per 100 parts by weight of the glass fiber). When the amount is below 0.02 PHP, no improvement in the physical properties is observed. On the other hand, addition of the silane lo compound in an amount of above 0.2 PHP fails to improve the mechanical properties and heat resistance of the resin composition.

Preferably, the glass fiber contains 0.2 to 1.2 PHP of an epoxy resin as binder. No effect of the binder is observed with the amount of below 0.2 PHP. When the binder is added in an amount of above 1.2 PHP, improvement in the physical properties of the resin composition is not so much but problems occur with respect to the heat stability such as coloring.

Taking the sum of the amounts of the components (a), (b), (c) and (d) as 100% by weight, the resin composition of the present invention contains
1 to 50% by weight of component (a),
10 to 90% by weight of component (b),
10 to 40% by weight of component (c), and
0 to 30% by weight of component (d).

When the content of the component (a) is below 1% by weight, improvement in the heat resistance and coating ability of the resin composition is not observed. On the other hand, the resin composition has insufficient chemical resistance when the content is above 50% by weight.

The resin composition has insufficient mechanical strength when the content of the component (b) is below 10% by weight and adhesion between the resin and glass fiber is insufficient when it exceeds 90% by weight.

The adhesion between the resin and glass fiber is also insufficient when the content of the component (C) is below 10% by weight. The mechanical strength of the resin composition is insufficient when the content of the component (c) is above 40% by weight.

When the content of the component (d) exceeds 30% by weight, there is observed remarkable decrease in the heat resistance of the resin composition.

In the resin composition of the present invention, the component (e) is used in an amount of 3 to 60 parts by weight per 100 parts by weight of the total weight of the components (a), (b), (c) and (d), When the content of the component (e) is below 3 parts by weight, the effect of reinforcement by the glass fiber is insufficient. On the other hand, when it is above 60 parts by weight, the resin composition has imbalanced kinetic properties and its manufacture is difficult.

Other high molecular compounds or polymers can be added to the resin composition of the present invention.

Examples of the other polymers include polyolefins such as polymethylpentene and polyethylene; homopolymers and copolymers of various vinyl compounds such as polyvinyl chloride, polystyrene, polymethyl methacrylate, polyvinyl acetate, polyvinylpyridine, polyvinylcarbazole, polyacrylamide, polyacrylonitrile, ethylene/vinyl acetate copolymer, alkenyl aromatic resins; polycarbonate, polysulfone, polyethylene terephthalate, polybutylene terephthalate, polyarylene ester (e.g., U polymer (trade name for a product by UNITIKA CORPORATION), polyphenylene sulfide; polyamides such as Nylon-6, Nylon-6,6 and Nylon-12; condensation polymers such as polyacetal, and the like. Also, there can be cited various thermosetting resins such as silicone resins, fluoroplastics, polyimides, polyamideimides, phenol resins, alkyd resins, unsaturated polyester resins, epoxy resins, diallyl phthalate resins and the like.

To the resin composition of the present invention can be added rosin resins, terpene resins, chroman/indene D resins, saturated alicyclic hydrocarbon resins, aromatic hydrocarbon resins, their hydrogenated products or modified products.

In practicing the present invention, it is possible to perform kneading with adding inorganic or organic fillers, plasticizers, stabilizers, dyes and pigments such as carbon black, silica, titanium oxide, etc.

To the resin used in the present invention, there can be added, if desired, various additives such as antioxidants, mineral oils, dyes, pigments, paraffin waxes, heat stabilizers, light stabilizers, lubricants, antistatic agents, inorganic or organic colorants, anticorrosion agents, crosslinking agents, foaming agents, plasticizers, fluorescent agents, surface smoothing agents, surface luster improving agents, flame retardants and the like during the manufacturing step or the processing step subsequent thereto.

The method of preparing the resin composition of the present invention is not limited particularly and any known method can be used. However, melt-kneading methods are practically used from an industrial point of view.

For the melt-kneading, generally used kneading apparatus such as single- or twin-screw extruders and various types of kneaders can be used. Particularly preferred is a high speed twin-screw extruder.

Before kneading, it is preferred to uniformly blend powder or pellets of the component resins together with glass fiber in a tumbler or a Henschel mixer. However, the blending may be omitted, if desired, and each resin may be fed to a kneader through a metering apparatus.

The resin composition, after kneading, is molded according to injection molding, extrusion molding, press molding, blow molding and the like. Alternatively, dry blending the resin materials at the injection or extrusion molding without prekneading and direct kneading are made in the melt processing to produce a shaped article.

The resin composition of the present invention has excellent heat resistance, processability, kinetic properties, chemical resistance and the like and making the use of these characteristics it can be used for preparing shaped articles, sheets, tubes, films, fibers, laminates, coating materials, and the like by injection molding or extrusion molding.

It can be used particularly for various parts of cars, for example, interior or exterior fitting materials C such as bumpers, installment panels, fenders, trims, door panels, wheel covers, side protectors, side seal garnish, trunk lids, hood, quarter panel, air cleaner, core material of seat, glove box, console box, cooling fan, sirocco fan, brake oil tank, lamp housing, air intake, lower apron, spoiler, front grille, radiator grille, mirror housing, bonnets, roof, etc., and parts of machines for which heat resistance is required.

It can also be used as materials for parts of motor cycles, for example, covering materials, muffler covers, leg shields, etc. Furthermore, it can be used as materials for electric and electronic parts for which mechanical strength and heat resistance are required, for example, housings, chassis, connectors, printed substrates, pulleys, and the like.

EXAMPLES

The present invention is explained referring to examples below, wherein they are merely illustrative ones, and the invention is not limited to them. Heat distortion temperature (which is abbreviated as H. D. T.), Izod impact strength (thickness: 3.2 mm) and bending test are observed in accordance with JIS K7207, JIS K7110 and JIS K6758, respectively.

The reduced viscosity ($\eta_{sp}/C$) of polyphenylene ether is measured as 0.5 g/dl chloroform solution at 25° C.

The intrinsic viscosity [$\eta$] of propylene polymer is measured as tetralin solution at 135° C. Both units of the reduced viscosity and the intrinsic viscosity are dl/g.

Heat resistance and kinetic properties are measured by using test pieces prepared by the following method. That is, predetermined amounts of the respective components and antioxidant are mixed in a powder mixer for 2 minutes and extruded through a screw extruder with a vent (screw: diameter 65 mm, C.R.=8.0) at 240° C. to form pellets. The composition thus obtained is injection molded under conditions of a resin composition of 270° C., a pressure of 870 kg/cm$^3$, and total cycle of 35 seconds to prepare test pieces, which are then subjected to tests for physical properties.

Tests for coating ability are performed as follows.

Preparation of Test Sample

A resin composition is molded through a 3 ounce injection molding machine with controlling the resin temperature at 260° C. to obtain samples in the form of plates having a size of 150 mm in length×90 mm in width×2 mm in thickness.

Coating Ability Test

The surfaces of the plate samples are washed in 1,1,1-trichloroethane vapor for 30 seconds and dried at room temperature. Thereafter, they are directly spray-coated with a urethane based coating material (FLEXENE #101, produced by NIPPON BEE CHEMICAL CO., LTD.) and bake-finished in an oven at 120° C. for 30 minutes, followed by standing at room temperature for 240 hours.

Adhesion Test of Coating Film

On the coating film of the above-described coated samples are cut 100 checker squares (10 squares×10 squares), each square being of a size of 2 mm square, with a razor blade, and CELLOTAPE (registered trademark for an adhesive tape manufactured by NICHIBAN CO., LTD.) 24 mm wide is pressed thereon with fingers. Thereafter, the end of the adhesive tape is held with fingers and the tape is peeled off from the coated film at a stroke. The number of remaining checkers of the coated film is evaluated as remaining ratio (%).

Examples 1 to 7 and Comparative Examples 1 to 4

The following are used as the components (a), (b), (c), (d) and (e).

Component (a); Polyphenylene Ether:

The polyphenylene ether used is one manufactured by NIPPON POLYETHER CO., LTD. Sample names (abbreviations) and reduced viscosity ($\eta_{sp}/C$) are as follows.

Po-1: $\eta_{sp}/C = 0.30$
PO-2: $\eta_{sp}/C = 0.52$

Component (b); Propylene Polymer:

Propylene polymer is used which has been prepared on a small scale by using Ziegler catalyst, Sample names (abbreviations), and inherent viscosity [$\eta$] and ethylene content are as follows.

PP-1: [$\eta$] = 1.03
Ethylene content: 0% by weight
PP-2: [$\eta$] = 1.34
Ethylene content: 3.3% by weight
PP-3: PP-1 melt-kneaded with vinylcyclohexane (vinylcyclohexane concentration: 340 ppm) [$\eta$] = 1.03
PP-4: PP-2 modified with styrene as follows.

Preparation of Modified PP-2:

Pellets (1 kg) of PP-2 are charged in a 10 liter autoclave together with 4 liters of water, 140 g of styrene monomer, 6 g of a dispersing agent (METLOSE 90SH-100, a trade name) and peroxide (PERBUTYL RV, a trade name) and reacted at 120° C. for about 1 hour in nitrogen stream followed by cooling. Then, polystyrene is extracted from the reaction mixture with methyl ethyl ketone to recover styrene-grafted propylene polymer composition. The amount of styrene grafted onto the propylene polymer composition is 113 g. Degree of graft polymerization is 80%.

Component (c); Oxygen-Containing Unsaturated Organic Compound-Modified Propylene Polymer:

Modified propylene polymer is prepared by adding acrylic acid or maleic anhydride to the propylene polymer produced on a small scale, charging the mixture together with SUNPEROX TO (trade name for a product by SANKEN KAKOU CO., LTD.) in a lump, and granulating them at a resin temperature of 230° C. by using a vent-type extruder (L/D=25, C.R.=3.3, diameter 65 mm)

Sample names (abbreviations) and composition are as follows.

MP-1: Base PP, [$\eta$] = 1.33, ethylene content: 0% by weight, maleic anhydride content: 1.9% by weight,
MP-2: [$\eta$] = 1.38, ethylene content: 1.2% by weight, acrylic acid content: 2.1% by weight,
MP-3: [$\eta$] = 1.31, ethylene content: 2.8% by weight, maleic anhydride content: 0.2% by weight.

Component (d); Rubber-like Substance:

Ethylene propylene copolymer which has been prepared on a small scale is used. Sample names and characteristics are as follows.

RU-1: [$\eta$] = 1.4, ethylene content: 71% by weight
RU-2: [$\eta$] = 1.9, ethylene content: 53% by weight
RU-3: Styrene-modified SUMITOMO ESPRENE E400 (trade name for a product by SUMITOMO CHEMICAL CO., LTD., propylene content: 32% by weight, $ML_{1+4}$ 121° C. = 52), styrene content: 8.3% by weight.

Other rubber-like substances used are shown below together with their abbreviations.

RU-4: SUMITOMO SBR 1507 (trade name for styrene/butadiene random copolymer rubber manufactured by SUMITOMO CHEMICAL CO., LTD.),
RU-5: KRATON G1650 (trade name for styrene/ethylene/butylene/ styrene block copolymer rubber (SEBS) manufactured by SHELL CHEMICAL CORP.),
RU-6: KRATON G1701X (trade name for styrene/ethylene/propylene block copolymer rubber (SEP) manufactured by SHELL CHEMICAL CORP.),
RU-7: DIENE 35A (trade name for polybutadiene manufactured by ASAHI CHEMICAL CO., LTD.).

Component (e): Glass Fiber:

Glass fiber used is treated with epoxy resin as binder on its surface. Sample names and treatments are as follows.

GF-1: 1 PHR of $\gamma$-aminopropyltrimethoxysilane is added to glass fiber.
GF-2: 1 PHR of vinylethoxysilane is added to glass fiber.

Resin compositions are obtained kneading the above components in proportions shown in Tables 1 and 2 below. Determination of the physical properties and coating tests are performed and results obtained are shown in Tables 1 and 2.

TABLE 1

| Sample | COMPOSITION (Parts by Weight) | | | | | PHYSICAL PROPERTY | | | |
|---|---|---|---|---|---|---|---|---|---|
| | Poly-Phenylene Ether PO-1 | Mofified Propylene Polymer MP-1 | Propylene Polymer PP-1 | Rubber-Like Substance RU-1 | Glass Fiber GF-1 | H.D.T 4.6 kg/cm² (°C.) | Izod Impact Notched (room t.) (kg·cm/cm) | Modulus of Flexural Elasticity (kg/cm²) | Coatability Test Ramaining Ratio (%) |
| Ex. 1 | 10 | 15 | 45 | 0 | 30 | 167 | 11 | 58000 | 100 |
| Ex. 2 | 10 | 15 | 45 | 10 | 30 | 162 | 15 | 56800 | 100 |
| Ex. 3 | 34 | 15 | 40 | 0 | 20 | 164 | 9 | 56000 | 98 |
| C. Ex. 1 | 0 | 18 | 42 | 0 | 30 | 158 | 9 | 55000 | 75 |
| C. Ex. 2 | 10 | 0 | 60 | 0 | 30 | 143 | 6 | 42000 | 64 |

TABLE 2

| Sample | COMPOSITION (Part by Weight) | | | | | PHYSICAL PROPERTY | | | |
|---|---|---|---|---|---|---|---|---|---|
| | Poly-Phenylene Ether PO-2 | Mofified Propylene Polymer | Propylene Polymer | Rubber-Like Substance | Glass Fiber GF-2 | H.D.T 4.6 kg/cm² (°C.) | Izod Impact Notched (room t.) (kg·cm/cm) | Modulus of Flexural Elasticity (kg/cm²) | Coatability Test Ramaining Ratio (%) |
| Ex. 4 | 25 | MP-2 35 | PP-2 15 | RU-2 10 | 15 | 148 | 18 | 39800 | 100 |
| Ex. 5 | 25 | MP-2 35 | PP-3 15 | RU-6 10 | 15 | 142 | 16 | 43500 | 97 |

TABLE 2-continued

| | COMPOSITION (Part by Weight) | | | | | PHYSICAL PROPERTY | | | |
|---|---|---|---|---|---|---|---|---|---|
| Sample | Poly-Phenylene Ether PO-2 | Mofified Propylene Polymer | Propylene Polymer | Rubber-Like Substance | Glass Fiber GF-2 | H.D.T 4.6 kg/cm$^2$ (°C.) | Izod Impact Notched (room t.) (kg · cm/cm) | Modulus of Flexural Elasticity (kg/cm$^2$) | Coatability Test Ramaining Ratio (%) |
| Ex. 6 | 25 | MP-2 35 | PP-4 15 | RU-4 7 RU-3 3 | 15 | 145 | 20 | 45000 | 99 |
| Ex. 7 | 25 | MP-3 35 | PP-4 15 | RU-5 8 RU-7 2 | 15 | 143 | 24 | 46200 | 100 |
| C. Ex. 3 | 0 | MP-2 35 | PP-4 15 | RU-4 7 RU-3 3 | 15 | 138 | 16 | 37000 | 58 |
| C. Ex. 4 | 0 | MP-2 60 | PP-4 15 | RU-4 7 RU-3 3 | 15 | 123 | 15 | 32600 | 76 |

From the results shown in Tables 1 and 2, it is apparent that the resin composition comprising polyphenylene ether (component (a)), propylene polymer (component (b)), oxygen-containing unsaturated organic compound-modified propylene polymer (component (c)), rubber-like substance (component (d)) and glass fiber treated with silane compound on its surface (component (e)) exhibits high heat resistance and excellent kinetic properties and is superior in coating ability to resin composition comprised by the components (b), (c), (d) and (e) (lacking component (a)).

As described above, the present resin composition not only has excellent molding processability but can also be molded into shaped articles superior in balance among various physical properties as well as in coating ability.

The novel resin composition provided by the present invention can be easily worked by shaping procedures which are familiar to the skilled artisan, for example, injection molding, extrusion molding, press molding, blow molding, etc., to give rise to various products which are superior in balance among physical properties such as impact strength, heat resistance and hardness, have excellent uniformity in appearance and in smoothness.

What is claimed is:

1. A resin composition comprising
    (A) 100 parts by weight of
        (a) 1 to 50% by weight of polyphenylene ether or polyphenylene ether-containing resin composition,
        (b) 10 to 90% by weight of propylene polymer which is not modified with an oxygen-containing unsaturated compound,
        (c) 10 to 40% by weight of propylene polymer grafted with an organic compound having one or more of an acid or acid anhydride unit selected from the group consisting of acrylic acid, methacrylic acid, maleic acid, itaconic acid, fumaric acid, maleic anhydride and itaconic anhydride, and
        (d) 0 to 30% by weight of a natural or synthetic polymeric elastomer which is elastic at room temperature, and
    (B) 3 to 60 parts by weight of
        (e) glass fiber treated with a silane compound on its surface.

2. A resin composition as claimed in claim 1, wherein said polyphenylene ether used as the component (a) is a polymer obtained by oxidation polymerization of one or more of phenol, compounds having the formula (I)

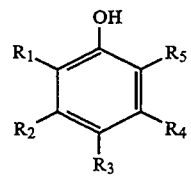

wherein $R_1$, $R_2$, $R_3$, $R_4$ and $R_5$ each represents a hydrogen atom, a halogen atom, or a substituted or unsubstituted hydrocarbon residue, and at least one of them is a hydrogen atom.

3. A resin composition as claimed in claim 1, wherein at least one propylene polymer of components (b) and (c) is a highly crystalline polypropylene which is a propylene homopolymer or block copolymer having an isotactic pentad fraction of 0.970 or higher, defined as an isotactic pentad fraction in a boiling heptane-insoluble portion of the propylene homopolymer portion of the propylene.

4. A resin composition as claimed in claim 1, wherein at least one propylene polymer of components (b) and (c) is a highly crystalline polypropylene which is a propylene homopolymer or block copolymer having an isotactic pentad fraction of 0.970 or higher, defined as an isotactic pentad fraction in a boiling heptane-insoluble portion of the propylene homopolymer, and having a content of a heptane-soluble portion of 5.0% by weight or less and a content of a 20° C. xylene-soluble portion of 2.0% by weight or less.

5. A resin composition as claimed in claim 1, wherein said propylene polymer as the component (b) is a crystalline propylene polymer which has an intrinsic viscosity [η] (tetraline solution, 135° C.) of from 1.00 to 1.50 dl/g and an ethylene content of 4% by weight or less.

6. A resin composition as claimed in claim 1, wherein said natural or synthetic polymeric elastomer is at least one component selected from the group consisting of ethylene/α-olefin copolymer and its modified products, butadiene/styrene copolymer and its modified products and epoxy group-containing copolymer.

7. A resin composition as claimed in claim 6, wherein said ethylene/α-olefin copolymer is one which has an ethylene content of 15 to 85% by weight, a Mooney viscosity (ML$_{1+4}$, 121° C.) of 5 to 120, and a glass transition point of −10° C. or less.

8. A resin composition as claimed in claim 1, wherein said silane compound as the component (e) is at least one silane compound selected from the group consisting of β-(3,4-epoxycyclohexyl) ethyltrimethoxysilane, γ-glycidoxypropyltrimethoxysilane, vinyltriethoxysilane, vinyltrichlorosilane, γ-aminopropyltriethoxysilane and N-β-(aminoethyl)-γ-aminopropyltrimethoxysilane.

9. Molded articles which are made of the resin composition as claimed in claim 1.

10. Automotive parts which are made of the resin composition claimed in claim 1.

11. An automotive part as claimed in claim 10, which is selected from the group consisting of bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, and roof.

12. The resin composition according to claim 6 wherein said natural or synthetic polymeric elastomer is at least one component selected from the group consisting of ethylene/propylene/unsaturated diene rubber and its modified products.

* * * * *